US010228072B1

(12) United States Patent
Tinholt et al.

(10) Patent No.: US 10,228,072 B1
(45) Date of Patent: Mar. 12, 2019

(54) VALVE STEM AND ASSEMBLY (71) Applicant: Humphrey Products Company, Kalamazoo, MI (US)

(72) Inventors: Thomas H. Tinholt, Galesburg, MI (US); Marc R. Larson, Kalamazoo, MI (US)

(73) Assignee: Humphrey Products Company, Kalamazoo, MI (US)

( * ) Notice: Subject to any disclaimer, the term of this patent is extended or adjusted under 35 U.S.C. 154(b) by 0 days.

(21) Appl. No.: 14/930,073

(22) Filed: Nov. 2, 2015

Related U.S. Application Data (60) Provisional application No. 62/074,355, filed on Nov. 3, 2014.

(51) Int. Cl.
*F16K 11/065* (2006.01)
*F16K 27/04* (2006.01)
*F16K 3/02* (2006.01)

(52) U.S. Cl.
CPC .......... *F16K 27/044* (2013.01); *F16K 3/0218* (2013.01); *F16K 3/0227* (2013.01); *F16K 3/0254* (2013.01); *F16K 11/0655* (2013.01)

(58) Field of Classification Search
CPC .......................... F16K 11/0655; F16K 11/048
USPC .......................... 137/625.48, 625.67, 625.69
See application file for complete search history.

(56) References Cited

U.S. PATENT DOCUMENTS

| 2,064,750 | A | 12/1936 | Hurst |
| 2,934,090 | A | 4/1960 | Kenann et al. |
| 3,027,134 | A | 3/1962 | Nichols |
| 3,172,637 | A | 3/1965 | Adams et al. |
| 3,427,988 | A | 2/1969 | Redman et al. |
| 3,510,103 | A | 5/1970 | Carsello |
| 3,521,851 | A | 7/1970 | Sorrow |
| 3,538,954 | A | 11/1970 | Fagerlie et al. |
| 3,580,284 | A | * 5/1971 | Bini ...................... F16K 11/044 137/595 |
| 3,666,382 | A | 5/1972 | Rasmussen |
| 3,902,526 | A | 9/1975 | Brake et al. |
| 4,021,153 | A | 5/1977 | Cloup |
| 4,026,325 | A | 5/1977 | Loveless |
| 4,066,101 | A | 1/1978 | de Fries |
| 4,074,700 | A | 2/1978 | Engle |
| 4,100,519 | A | 7/1978 | Neff |
| 4,103,711 | A | 8/1978 | Arvin |
| 4,159,026 | A | 6/1979 | Williamson |
| 4,187,884 | A | 2/1980 | Loveless |
| 4,267,862 | A | 5/1981 | Neff et al. |

(Continued)

*Primary Examiner* — Marina Tietjen
*Assistant Examiner* — Paul J Gray
(74) *Attorney, Agent, or Firm* — Gardner, Linn, Burkhart & Ondersma LLP (57) ABSTRACT

A valve includes a valve stem having a shaft and including first and second poppet members with a seal portion extending radially outward from the shaft and disposed on the shaft between the poppet members. The valve further includes a valve body having a valve bore within which the valve stem is disposed for reciprocating axial movement and includes first and second ports that defining passageways through which gas or liquid may flow into or out of the valve bore. The valve body further includes first and second valve seats against which the first and second poppet members selectively seal with the seal portion being in sealing engagement with the valve bore between the ports.

21 Claims, 7 Drawing Sheets

(56) References Cited

U.S. PATENT DOCUMENTS

| | | |
|---|---|---|
| 4,301,715 A | 11/1981 | Acar |
| 4,376,618 A | 3/1983 | Toyoda et al. |
| 4,382,452 A | 5/1983 | Loveless |
| 4,442,998 A | 4/1984 | Ohyama et al. |
| 4,485,856 A | 12/1984 | Neff |
| 4,494,572 A | 1/1985 | Loveless |
| 4,501,299 A | 2/1985 | Klimowicz et al. |
| 4,524,807 A | 6/1985 | Toliusis |
| 4,544,988 A | 10/1985 | Hochstein |
| 4,566,490 A | 1/1986 | Neff |
| 4,574,844 A | 3/1986 | Neff et al. |
| 4,746,888 A | 5/1988 | Ichihashi et al. |
| 4,809,749 A | 3/1989 | Ichihashi |
| 4,823,842 A | 4/1989 | Toliusis |
| 4,842,020 A | 6/1989 | Tinholt |
| 4,842,246 A | 6/1989 | Floren et al. |
| 4,844,122 A | 7/1989 | Ichihashi |
| 4,874,299 A | 10/1989 | Lopez et al. |
| 4,887,430 A | 12/1989 | Kroll et al. |
| 4,915,134 A | 4/1990 | Toliusis et al. |
| 4,971,114 A | 11/1990 | Ichihashi et al. |
| 4,971,115 A | 11/1990 | Tinholt |
| 4,973,024 A | 11/1990 | Homma |
| 5,127,624 A | 7/1992 | Domke |
| 5,144,813 A | 9/1992 | Orner et al. |
| 5,211,198 A | 5/1993 | Tinholt |
| 5,211,371 A | 5/1993 | Coffee |
| 5,306,979 A | 4/1994 | Schwarz, Jr. |
| 5,332,000 A | 6/1994 | Gassner |
| 5,518,375 A | 5/1996 | Vandromme et al. |
| 5,605,178 A | 2/1997 | Jennins |
| 5,617,895 A * | 4/1997 | Pfuhl ................ F15B 13/0402 137/625.3 |
| 5,848,881 A | 12/1998 | Frezza |
| 6,050,542 A | 4/2000 | Johnson et al. |
| 6,105,931 A | 8/2000 | Frank et al. |
| 6,133,816 A | 10/2000 | Barnes et al. |
| 6,279,869 B1 | 8/2001 | Olewicz |
| 6,404,098 B1 | 6/2002 | Kayama et al. |
| 6,405,757 B1 | 6/2002 | Jabcon |
| 6,425,409 B1 | 7/2002 | Cross et al. |
| 6,488,050 B1 | 12/2002 | Jabcon |
| 6,523,570 B2 | 2/2003 | Weiss et al. |
| 6,633,095 B1 | 10/2003 | Swope et al. |
| 6,684,896 B2 | 2/2004 | Weiss et al. |
| 6,742,761 B2 | 6/2004 | Johnson et al. |
| 6,843,465 B1 | 1/2005 | Scott |
| 6,916,159 B2 | 7/2005 | Rush et al. |
| 7,260,932 B1 | 8/2007 | Klimowicz |
| 7,331,616 B2 | 2/2008 | Brei et al. |
| 7,377,759 B2 | 5/2008 | Sallows et al. |
| 7,448,411 B2 | 11/2008 | Friedman et al. |
| 7,723,896 B2 | 5/2010 | Esashi et al. |
| 7,980,269 B2 * | 7/2011 | Fry .................... B61D 7/28 105/286 |
| 8,186,978 B2 | 5/2012 | Tinholt et al. |
| 8,528,597 B2 | 9/2013 | Friedman et al. |
| 8,794,266 B1 | 8/2014 | Friedman et al. |
| 2005/0224119 A1* | 10/2005 | Okamoto ............ F16J 15/104 137/625.69 |
| 2012/0085436 A1* | 4/2012 | Jones .............. F16H 61/0251 137/485 |

* cited by examiner

VALVE STEM AND ASSEMBLY

CROSS REFERENCE TO RELATED APPLICATION

The present application claims priority of U.S. provisional application Ser. No. 62/074,355 filed Nov. 3, 2014, which is hereby incorporated herein by reference in its entirety

BACKGROUND OF THE INVENTION

The present invention is directed to a valve, and in particular to a valve with a valve stem having a dynamic seal positioned between a pair of poppets.

Valve stems include sealing surfaces that are used to form seals against the flow of air or fluid by engaging with corresponding surfaces within a valve body.

SUMMARY OF THE INVENTION

The present invention provides a valve having a valve stem that includes a dynamic seal positioned between a pair of poppets for generally pressure balanced sealing of valve ports.

According to an aspect of the present invention, a valve includes a valve stem and a valve body, with the valve stem having a shaft and including a first poppet member, a second poppet member and a seal portion on the shaft with poppet members and seal portion extending radially outward from the shaft and with the seal portion disposed between the poppet members. The valve body includes a valve bore within which the valve stem is disposed for reciprocating axial movement. The valve body includes a first port and a second port with the ports defining passageways through which gas or liquid may flow into or out of the valve bore. The valve further includes valve seats against which the poppet members selectively seal with the seal portion being in sealing engagement with the valve bore between the passageways.

The valve stem arrangement and body configuration provide a generally pressure balanced valve stem. The valve may comprise a two or three way valve, with the dynamic seal portion separating the normally open and normally closed ports. Common ports of the valve are outside the poppets and are connected through the valve body or a manifold. The valve provides high flow over a wide pressure range with only one dynamic seal that separates the ports located between the poppets.

These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures. With reference to the embodiment of FIGS. 1 and 2, valve 20 may be used with gasses or liquids and is shown to include a valve stem 22 that is axially moved by an actuator 24 within valve body 26. Valve stem 22 includes a dynamic sliding seal portion 28 separating a pair of ports 30a, 30b, with seal portion 28 being disposed between a pair of poppets or poppet members or portions 32, 34 of valve stem 22. In the illustrated embodiment each poppet member 32, 34 includes a poppet seal ring 36a, 36b respectively, that selectively seals against valve seats 38, 40, respectively, of valve body 26 when valve stem 22 is axially moved within body 26. As discussed below, seal portion 28 separates ports 30a, 30b and forms a seal there between, with valve stem 22 being approximately pressure balanced by way of seal portion 28 and poppet members 32, 34. It should be appreciated, as also discussed below, that although valve 20 is illustrated in connection with an electrical solenoid actuator 24 for movement of valve stem 22, other alternative actuators may be utilized for movement of valve stem 22, such as a fluid pilot actuator, piezoelectric actuator, shape memory alloy (SMA) actuator, or other actuator driver.

Figure 1:
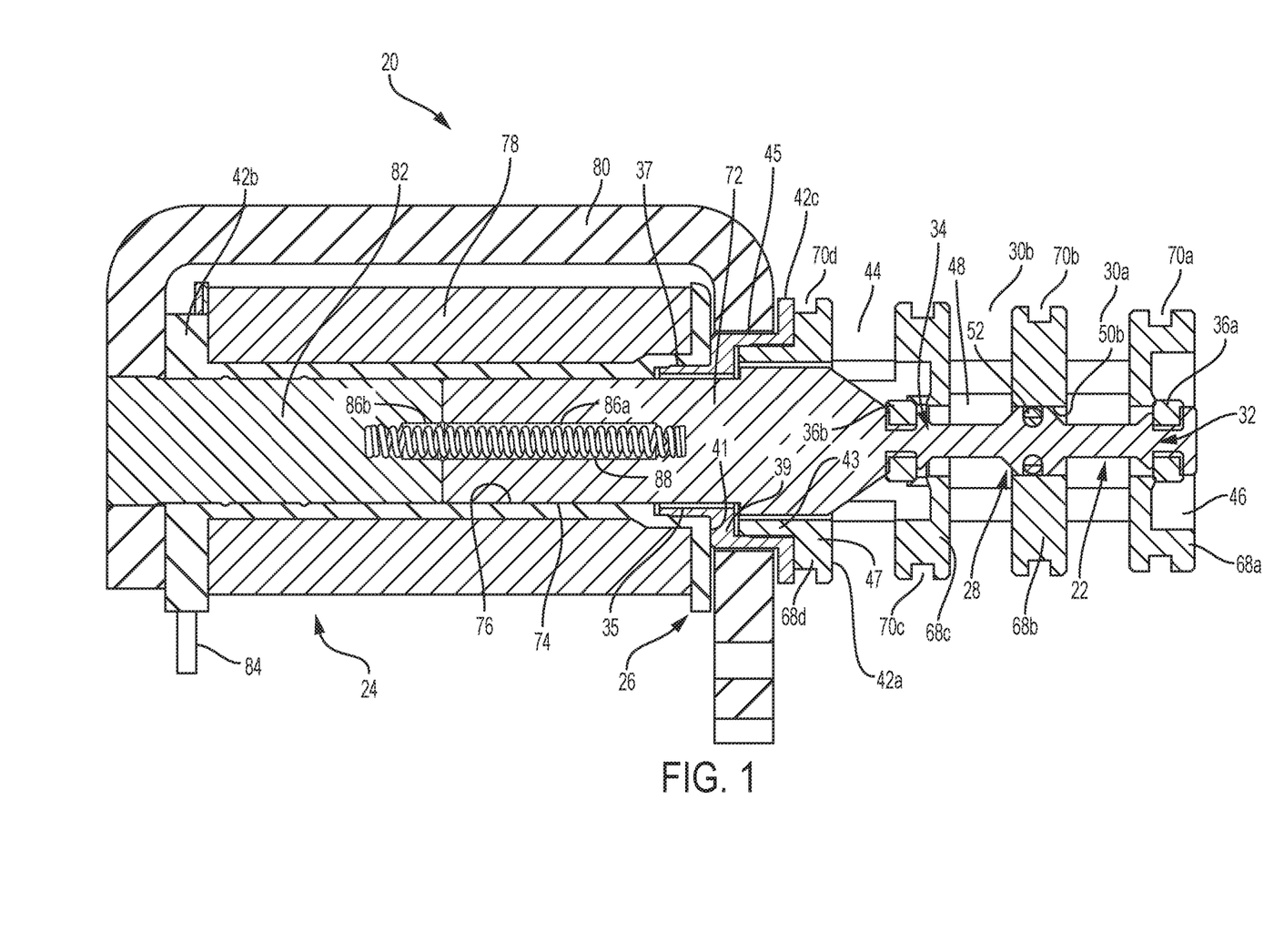
FIG. 1 is a cross sectional view of a valve in accordance with the present invention having three radial ports and a three piece body.
Figure 2:
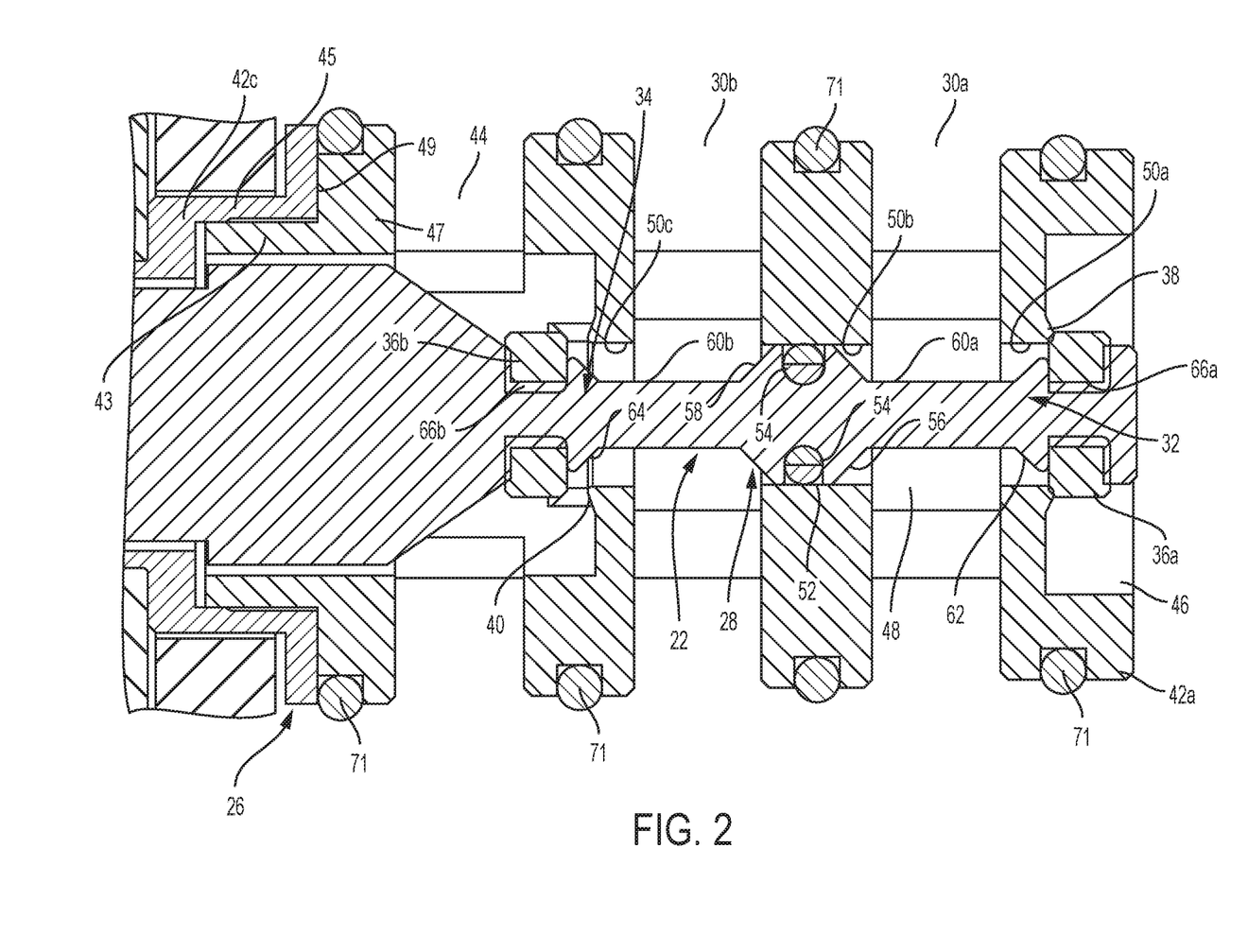
FIG. 2 is a close up cross sectional view of the valve stem and lower body portion of the valve of FIG. 1.

In the embodiment of FIGS. 1 and 2, valve body 26 comprises a three-piece body, having a first or stem portion 42a, a second or bobbin portion 42b, and a third or connector portion 42c. Stem portion 42a and bobbin portion 42b are constructed of diamagnetic or non-magnetic materials, such as plastic, with connector portion 42c being constructed from a magnetic material, such as a metallic material. In the illustrated embodiment connector portion 42c includes a longitudinally extending, circumferentially oriented flange 35 that engages or mates with an internal bore 37 of bobbin portion 42b, with a shoulder 39 of connector portion 42c engaging or mating with a radial surface 41. Similarly, stem portion 42a includes a longitudinally extending, circumferentially oriented flange 43 that engages or mates with an internal bore 45 of connector portion 42c, with a shoulder 47 of stem portion 42a engaging or mating with a radial surface 49 of connector portion 42c. The various portions 42a, 42b, 42c may be press fit, adhesively attached, or fused together. Other valve body constructions may be employed, however, as discussed below.

In addition to ports 30a, 30b, valve body 26 further includes port 44 and end port 46. Port 44 along with ports 30a and 30b comprise radial ports that allow gas or liquid to flow in or out in a generally radial direction relative to the axial orientation of valve stem 22. End port 46 is configured to enable a gas or liquid to flow in or out from an approximately axial orientation.

Stem portion 40a of valve body 26 includes a passageway or bore 48 within which valve stem 22 axially moves back and forth. Bore 48 includes inner bores defined by multiple lands 50a, 50b, 50c that are all of substantially similar diameter. Valve seats 38, 40 are disposed at lands 50a, 50c, respectively, with each land including an axially opposed lip against which the poppet seal rings 36a, 36b contact for sealing engagement. Seal portion 28 of valve stem 22 is disposed at land 50b whereby land 50b defines a sealing bore, with seal portion 28 including a seal ring 52 disposed within a groove 54 of seal portion 28. Seal ring 52 in the illustrated embodiment comprises an elastomeric o-ring having a circular cross sectional profile and is sized such that the radially most outer circumference contacts the inner diametrical surface of land 50c to thereby seal against valve body 26. Similarly, seal rings 36a, 36b comprise elastomeric circular rings having a generally square or rectangular cross section, but may have alternative profiles. Although bore 48 is shown in the illustrated embodiment to include inner bores 50a, 50b, 50c, it should be appreciated that in an alternative arrangement bore 48 may have a single diameter extending the length of valve stem 22.

Valve stem 22 includes a pair of generally conical or frustoconical face portions 56, 58 at seal portion 28 on either side of groove 54, where face portions 56, 58 form an expanded surface area relative to the diameter of main shaft portions 60a and 60b. Poppet member 32 similarly includes a generally conical or frustoconical face portion 62 opposed relative to face portion 56, and poppet member 34 likewise includes a generally conical or frustoconical face portion 64 opposed relative to face portion 58. Face portions 62, 64 form or are adjacent grooves 66a, 66b in valve stem 22 that receive seal rings 36a, 36b, respectively, and in the illustrated embodiment form at least a portion of the surface against which the pressurized gas or liquid in valve 20 would act against to maintain valve stem 22 in a generally pressure balanced state. For example, with reference to FIGS. 1 and 2, valve stem 22 is shown in an actuated position having been actuated by actuator 24 whereby seal 36a is shown in a closed or sealed position against valve seat 38 such that flow into or out of ports 30a and 46 is prevented, but with any pressurized substance being delivered into valve 20 through bore 30a acting on both poppet member 32 and seal portion 28 to maintain valve stem 22 in an approximately pressure balanced state. Additionally with respect to the orientation of valve stem 22 in FIGS. 1 and 2, a pressurized gas or liquid provided or delivered into valve 20 via port 30b would then flow across the opening between valve seat 40 and seal ring 36b and out of port 44, with this opening thus defining a valve opening.

In the illustrated embodiment stem portion 42a of valve body 26 is configured to include circular ribs 68a, 68b, 68c, 68d adjacent to or dividing or separating the ports 30a, 30b, 44 and 46, with each rib including a groove or gland 70a, 70b, 70c, 70d, respectively, for receiving seal rings, such as o-rings 71 (FIG. 2) therein. Stem portion 42a may thus be inserted into a structure for controlling flow there through, such as into a bore of a manifold or the like having flow passages there through. Stem portion 42a is further connected or joined with second or bobbin portion 42b of valve body 26 via connector portion 42c.

In the illustrated embodiment valve stem 22 is connected or joined to armature 72, or may be formed therewith, where armature 72 is part of actuator 24 and comprises a magnetically actuated member that is axially moved via actuator 24. As shown in FIG. 1, armature 72 includes a cylindrical main body portion 74 that axially moves within an inner bore or diameter 76 of bobbin portion 42b of valve body 26. Actuator 24 further includes coil windings 78 disposed about bobbin portion 42b with a magnetic frame 80 in turn disposed about bobbin portion 42b, where frame 80 is constructed in the illustrated embodiment as a steel C-frame. A fixed steel pole piece 82 extends into bore 76 and is connected with frame 80. Leads 84 extend into bobbin portion 42b for providing electrical actuation to coil windings 78. Still further, armature 72 and pole piece 82 are shown to include pockets 86a, 86b, respectively, for receiving and retaining a biasing member 88 constructed as a spring for returning stem 22 to the un-actuated position. Armature 72 is shown in an actuated position in FIGS. 1 and 2, which in turn actuates valve stem 22 to close port 30a. That is, current supplied to windings 78 draws armature 72 upwards to seal the seal ring 36a against valve seat 38. Upon removal of current, spring 88 will drive armature 72, and in turn valve stem 22 in the axially opposite direction to cause seal ring 36b to seal against valve seat 40 and thereby close port 30b and open port 30a. That is, seal ring 36a will be released from valve seat 38 to enable flow there past. To the extent a pressurized gas or liquid is being delivered into port 30b valve stem will be approximately pressure balanced by way of seal portion 28 and poppet 34.

Figure 3:
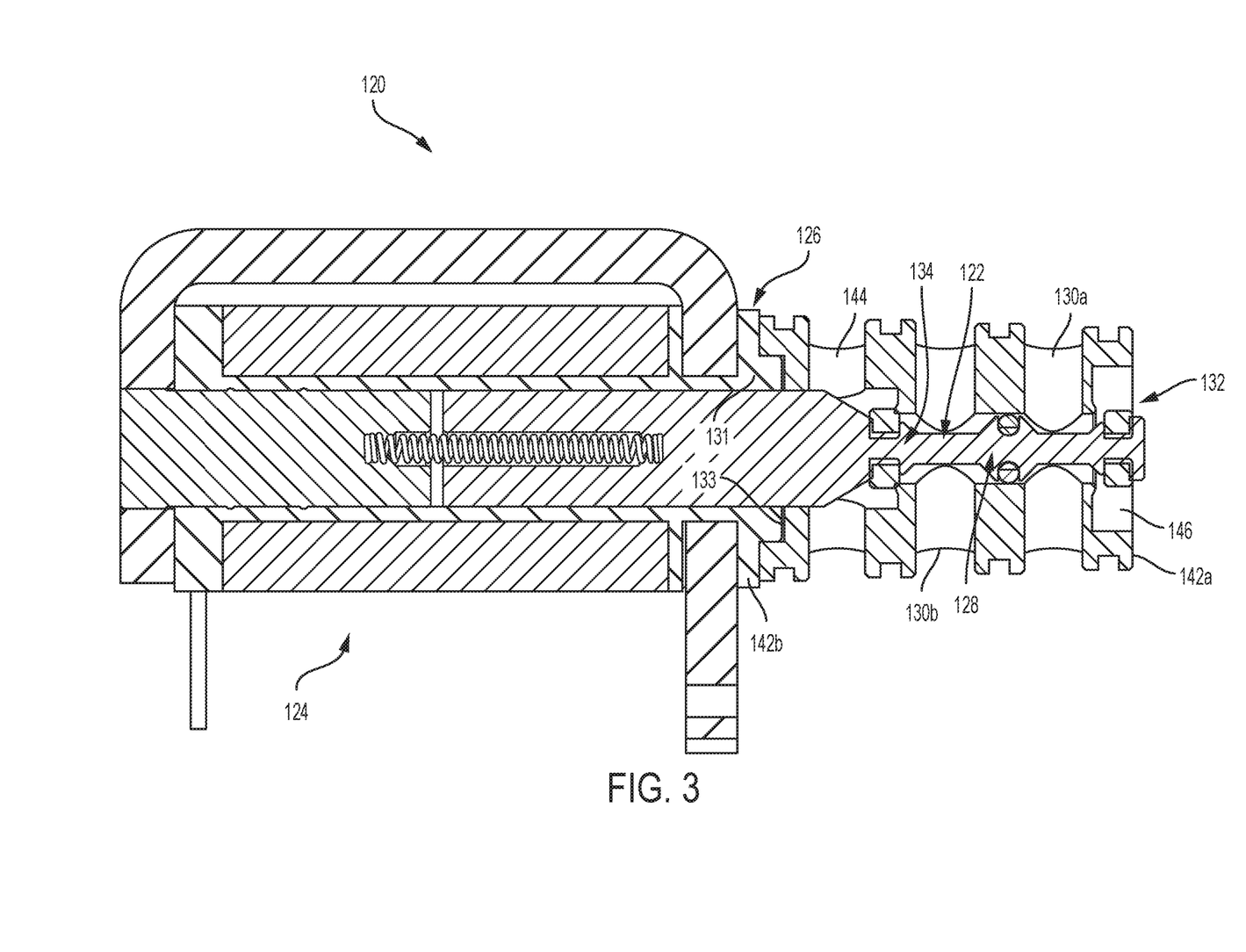
FIG. 3 is a cross sectional view of another valve in accordance with the present invention having three radial ports and a two piece body.

Referring now to FIG. 3, an alternative valve 120 is shown that is of substantially similar construction to valve 20, with 100 being added to the reference numbers in valve 120 with respect to corresponding features in valve 20. Due to the similarities not all of the features and functions will be discussed herein relative to valve 120. Valve 120 includes valve stem 122 that is actuated via actuator 124 for axial movement. Valve stem 122 includes a sliding seal portion 128 positioned between poppets 132, 134, where sliding seal portion 128 operates to provide a pressure balanced stem relative to radially oriented ports 130a and 130b. Valve 120 also includes an additional radially oriented port 144, as well as an end port 146. Valve 120 also includes a valve body 126, but in contrast to valve body 26, valve body 126 comprises a two-piece body having a first or stem portion 142a connected or joined to or with a second or bobbin portion 142b. The bobbin portion 142b includes a circumferential shoulder 131 that presses into a bore or cavity 133 of stem portion 142a.

Figure 4:
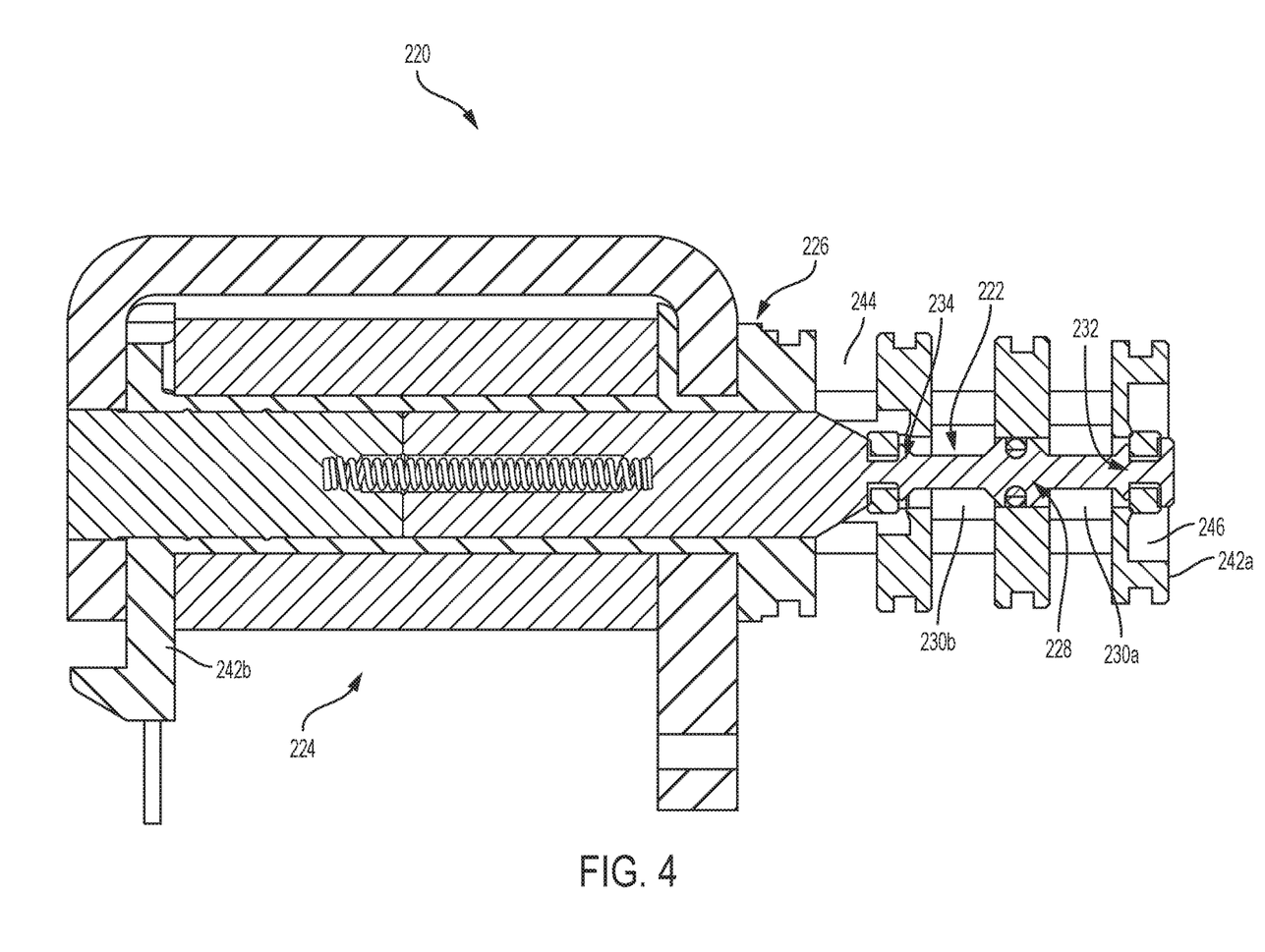
FIG. 4 is a cross sectional view of still another valve in accordance with the present invention having three radial ports and a single piece body.

Referring now to FIG. 4, still another valve 220 is shown that is of substantially similar construction to valves 20 and 120, with 200 being added to the reference numbers in valve 220 with respect to corresponding features in valve 20. Due to the similarities not all of the features and functions will be discussed herein relative to valve 220. Valve 220 includes valve stem 222 that is actuated via actuator 224 for axial movement. Valve stem 222 includes a sliding seal portion 228 positioned between poppets 232, 234, where sliding seal portion 228 operates to provide a pressure balanced stem relative to radially oriented ports 230a and 230b. Valve 220 also includes an additional radially oriented port 244, as well as an end port 246. Valve 220 also includes a valve body 226, but in contrast to valve body 26, valve body 226 comprises a one-piece body having a first or stem portion 242a that is unitarily or integrally formed with a second or bobbin portion 242b.

Figure 5:
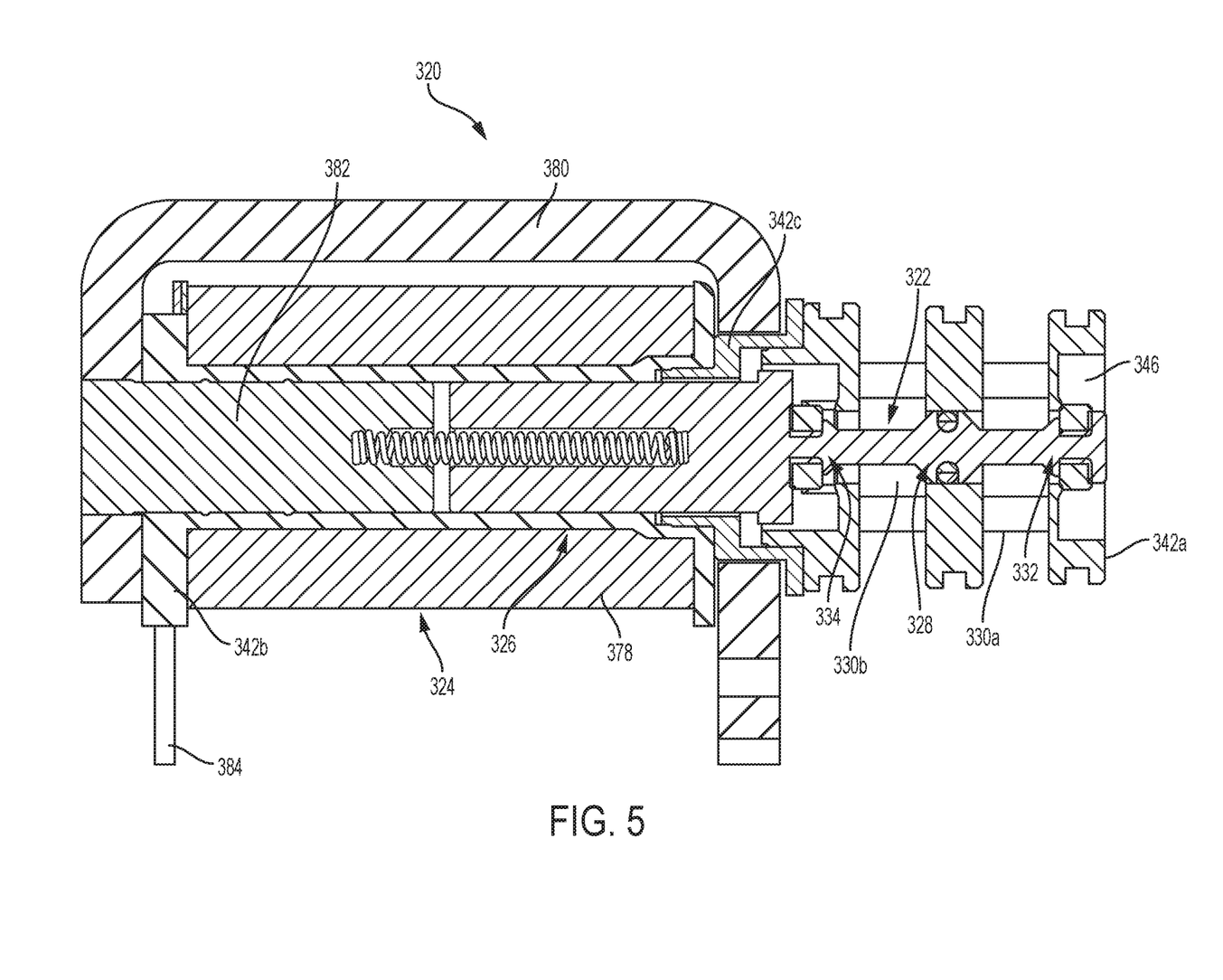
FIG. 5 is a cross sectional view of yet another valve in accordance with the present invention having two radial ports and a three piece body.
Figure 6:
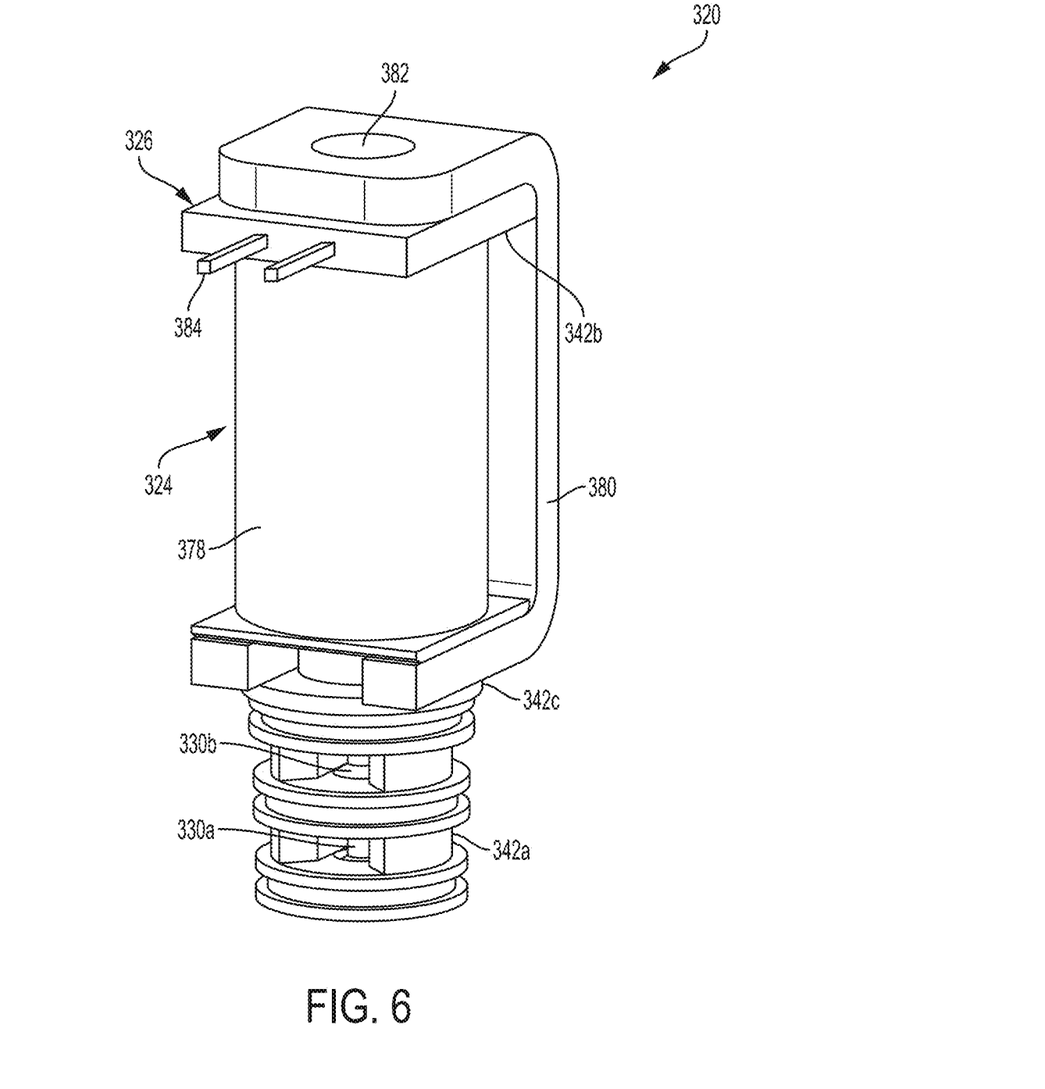
FIG. 6 is a perspective view of the valve of FIG. 5.

Referring now to FIGS. 5 and 6, yet another valve 320 is shown that is also of similar construction to valves 20, 120 and 220, with 300 being added to the reference numbers in valve 220 with respect to corresponding features in valve 20. Due to the similarities not all of the features and functions will be discussed herein relative to valve 320. Valve 320 includes valve stem 322 that is actuated via actuator 324 for axial movement. Valve stem 322 includes a sliding seal portion 328 positioned between poppets 332, 334, where sliding seal portion 328 operates to provide a pressure balanced stem relative to radially oriented ports 330a and 330b. Valve 320 includes an end port 346, but in contrast to the above discussed valves, valve 320 does not include an additional radial oriented port. Valve 320 includes a valve body 326 comprising a three-piece valve body in like manner to valve body 26 of valve 20. Valve body 326 thus comprises a first or stem portion 342a, a second or bobbin portion 342b, and a third or connecting portion 342c that are joined or interconnected together as shown in FIG. 5. Alternatively, however, it should be appreciated that valve body 326 may be formed as a single component or portion, or a different number of components or portions from that illustrated. As understood from FIG. 5, actuator 324 of valve 320 includes coil windings 378 disposed about bobbin portion 342b with leads 384 provided through bobbin portion 342b, and a pole piece 382 is fixedly connected to magnetic frame 380.

Figure 7:
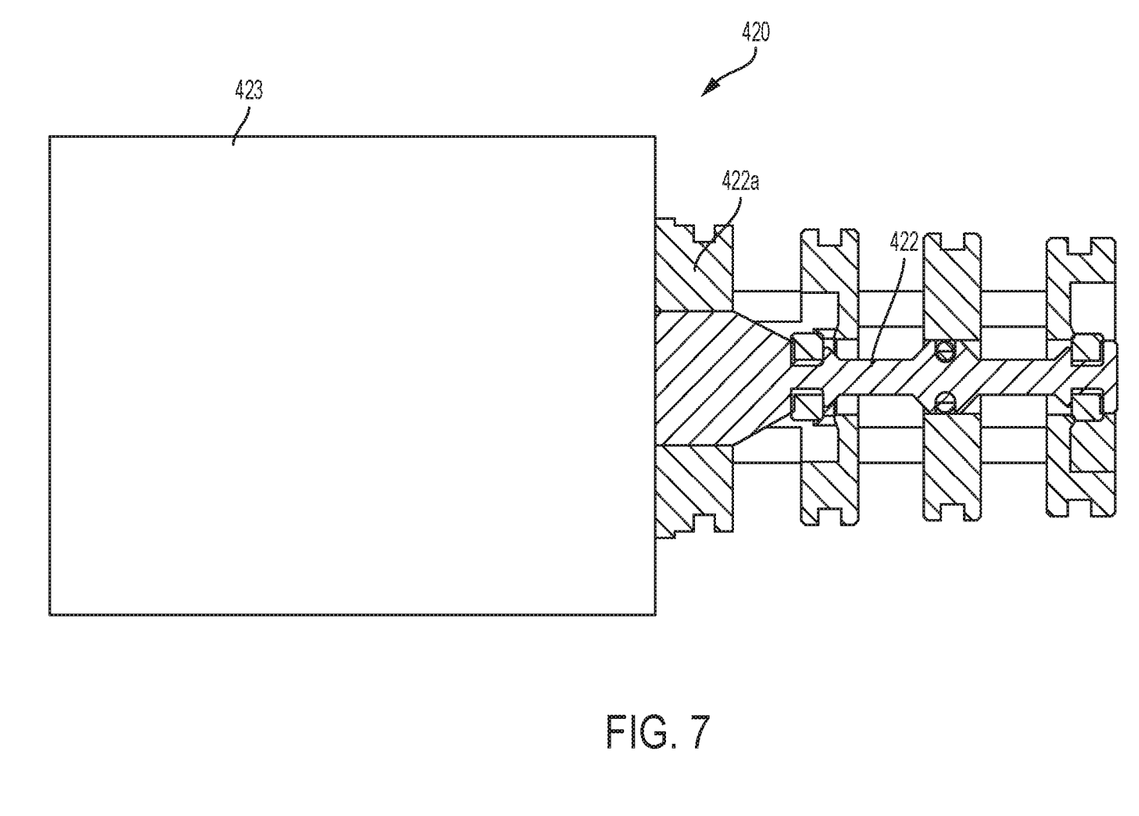
FIG. 7 is a cross sectional view of a valve in accordance illustrating the use of alternative actuators for imparting movement to the valve stem.

As previously noted, and understood from FIG. 7, alternative actuators or actuator drivers may be employed to cause actuation of the disclosed pressure balanced valve stem other than the illustrated electrical solenoid actuators. Valve 420 of FIG. 7 illustrates an actuator 423 operatively connected with valve stem 422, where valve stem 422 reciprocates within stem portion 442a of the valve body. Actuator 423 may comprise a fluid pilot actuator, a piezoelectric actuator, or a shape memory alloy (SMA) actuator, as are known in the art. For example, valve 420 may be operated with actuator 423 comprising a shape memory wire such as disclosed in U.S. Pat. No. 8,528,597, which is incorporated herein by reference.

Correspondingly alternative biasing members other than springs may be employed for returning the valve stem to the un-actuated position, such as a magnet, fluid or the like. Still further, the valve body may be alternatively constructed for use in various applications and still operate as intended. With respect to the stem portion of the body, for example, the body may be insert, manifold or in-line ported. Rather than including circular ribs with o-rings disposed thereabout, such as ribs 68a-68c and o-rings 71, for example, the ports may be formed as passages in the stem portion of the body.

Although the above disclosed valves are disclosed employing poppet seal rings it should also be appreciated that alternative sealing arrangements may be employed, including alternatively configured or shaped seal rings. Valves may also be constructed without poppet seal rings, in which case the poppets themselves may seal against the valve seats. The valve stem and/or stem portion of the body may be constructed of alternative materials as well, such as metal or plastic.

Still further changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A valve, said valve comprising:
a valve stem, said valve stem being selectively moveable and comprising an elongated shaft and including a first poppet member, a second poppet member and a seal portion on said shaft with said poppet members and said seal portion being disposed on said shaft whereby said shaft, said poppet members and said seal portion integrally move in unison, and with said poppet members and said seal portion extending radially outward from said shaft and said seal portion being disposed between said poppet members wherein said valve stem operates as a pressure balanced valve stem;
a valve body, said valve body including a valve bore within which said valve stem is disposed for reciprocating axial movement and including a first port and a second port with said ports defining passageways through which gas or liquid may flow into or out of said valve bore; and
a first valve seat and a second valve seat against which said first poppet member and said second poppet member respectively selectively seal based on axial movement of said valve stem with said seal portion being in continuous sealing engagement with a sealing bore portion of said valve bore between said passageways to inhibit gas or liquid flowing into or out of said ports from flowing past said seal portion;
wherein when said first poppet member is sealed against said first valve seat gas or liquid is inhibited from flowing into or out of said first port and said second poppet member is not sealed against said second valve seat such that gas or liquid may flow into or out of said second port, and wherein when said second poppet member is sealed against said second valve seat gas or liquid is inhibited from flowing into or out of said second port and said first poppet member is not sealed against said first valve seat such that gas or liquid may flow into or out of said first port.

2. The valve of claim 1, wherein said valve seats are formed on said valve body.

3. The valve of claim 1, wherein said seal portion includes a seal ring circumferentially disposed thereabout, and wherein said seal ring contacts said valve bore for sealing engagement there between.

4. The valve of claim 3, wherein said seal portion includes a groove circumferentially disposed thereabout, and wherein said seal ring is disposed in said groove.

5. The valve of claim 1, wherein said seal portion includes a pair of angled face portions radially extending from said shaft, with one of said face portions facing said first poppet member and the other said face portion facing said second poppet member.

6. The valve of claim 5, wherein said face portions define conical portions disposed about said valve stem.

7. The valve of claim 1, wherein said poppet members each include a poppet seal ring circumferentially disposed about said valve stem.

8. The valve of claim 7, wherein said poppet members each include a poppet groove circumferentially disposed about said valve stem, and wherein said poppet seal rings are disposed in respective ones of said poppet grooves.

9. The valve of claim 1, wherein each said poppet member includes an angled poppet face portion radially extending from said shaft, each said poppet face portion facing said seal portion.

10. The valve of claim 1, wherein said valve body comprises a stem portion within which said valve stem is disposed.

11. The valve of claim 10, wherein said valve body comprises a multi-piece body.

12. The valve of claim 1, wherein said valve body includes more than two ports, and wherein each said port defines a passageway through which gas or liquid may flow into or out of said valve bore.

13. The valve of claim 1, further including an actuator for actuating said valve stem for axial movement.

14. A valve, said valve comprising:
- a valve stem, said valve stem comprising an elongated shaft and including a first poppet member, a second poppet member and a seal portion on said shaft with said poppet members and said seal portion being disposed on said shaft whereby said shaft, said poppet members and said seal portion integrally move in unison, and with said poppet members and said seal portion extending radially outward from said shaft and with said seal portion disposed between said poppet members wherein said valve stem operates as a pressure balanced valve stem;
- a valve body, said valve body including a valve bore within which said valve stem is disposed for reciprocating axial movement and including a first port and a second port with said ports defining passageways through which gas or liquid may flow into or out of said valve bore;
- a first valve seat and a second valve seat against which said first poppet member and said second poppet member respectively selectively seal with said seal portion being in continuous sealing engagement with a sealing bore portion of said valve bore between said passageways to inhibit gas or liquid flowing into or out of said ports from flowing past said seal portion; and
- an actuator, said actuator configured to impart axial movement to said valve stem such that said shaft, said poppet members and said seal portion integrally move together to selectively open and close selected ones of said ports;
- wherein when said first poppet member is sealed against said first valve seat gas or liquid is inhibited from flowing into or out of said first port and said second poppet member is not sealed against said second valve seat such that gas or liquid may flow into or out of said second port, and wherein when said second poppet member is sealed against said second valve seat gas or liquid is inhibited from flowing into or out of said second port and said first poppet member is not sealed against said first valve seat such that gas or liquid may flow into or out of said first port.

15. The valve of claim 14, wherein each said poppet member includes a poppet face portion radially extending from said shaft and wherein said seal portion includes a pair of expanded seal face portions radially extending from said shaft, with one of said seal face portions facing said poppet face portion of said first poppet member whereby said valve stem is in pressure balanced operation when said first port is closed, and with the other said seal face portion facing said poppet face of said second poppet member whereby said valve stem is in pressure balanced operation when said second port is closed.

16. The valve of claim 15, wherein said seal portion includes a seal ring circumferentially disposed thereabout, and wherein said seal ring contacts said valve bore for sealing engagement there between.

17. The valve of claim 15, wherein said poppet members each include a poppet seal ring circumferentially disposed about said valve stem.

18. The valve of claim 15, wherein said valve body comprises a multi-piece body.

19. The valve of claim 15, wherein said valve body includes a bobbin portion and a valve stem portion with said valve stem disposed within said valve stem portion and wherein said actuator includes coils wound about said bobbin portion, wherein a pole piece and an armature are at least partially disposed within said bobbin portion, and wherein said valve stem is operatively connected to said armature.

20. The valve of claim 19, further including a third port, and wherein said first and second ports are radially oriented relative to said valve bore, and wherein said third port is axially oriented relative to said valve bore.

21. A valve, said valve comprising:
- a valve stem, said valve stem being selectively moveable and comprising an elongated shaft and including a first poppet member, a second poppet member and a seal portion on said shaft with said poppet members and said seal portion being disposed on said shaft whereby said shaft, said poppet members and said seal portion integrally move in unison, and with said poppet members and said seal portion extending radially outward from said shaft and said seal portion being disposed between said poppet members wherein said valve stem operates as a pressure balanced valve stem;
- a valve body, said valve body including a valve bore within which said valve stem is disposed for reciprocating axial movement and including a first port and a second port with said ports defining passageways through which gas or liquid may flow into or out of said valve bore; and
- a first valve seat and a second valve seat against which said first poppet member and said second poppet member respectively selectively seal based on axial movement of said valve stem with said seal portion being in sealing engagement with said valve bore between said passageways, and further including an armature and an actuator, said armature being unitarily formed with said valve stem and said actuator selectively actuating movement of said armature to thereby impart axial motion to said valve stem
- wherein when said first poppet member is sealed against said first valve seat gas or liquid is inhibited from flowing into or out of said first port and said second poppet member is not sealed against said second valve seat such that gas or liquid may flow into or out of said second port, and wherein when said second poppet member is sealed against said second valve seat gas or liquid is inhibited from flowing into or out of said second port and said first poppet member is not sealed against said first valve seat such that gas or liquid may flow into or out of said first port.

* * * * *